Jan. 17, 1956  J. PAVELKA, JR  2,731,539
FOOD HEATER AND COOKER
Filed Dec. 17, 1952

INVENTOR.
Joseph Pavelka Jr.
BY Rodney Bedell
atty.

United States Patent Office 2,731,539
Patented Jan. 17, 1956

2,731,539
FOOD HEATER AND COOKER

Joseph Pavelka, Jr., St. Louis, Mo., assignor to The Toastswell Company, Inc., St. Louis, Mo., a corporation of Missouri Application December 17, 1952, Serial No. 326,392

4 Claims. (Cl. 219—19)

The invention relates to heating devices suitable for keeping cooked food warm, or even for moderate cooking operations, of a nature adapted to be placed upon a household table. The invention consists in the combination of a simple, effective housing, provided with electric resistance heating elements, and a plurality of food containers readily assembled and disassembled with the housing and suitable in themselves for supplying food to serving plates.

One object of the invention is to provide a unit which will mount and substantially enclose a plurality of food containers and will maintain substantially uniform temperatures of the food in the containers.

Another object is to provide an automatic control for the heating elements which will be actuated approximately by the temperature of the food in the containers rather than by the temperature in the housing or the temperature of an exterior portion of the containers nearest to the heating elements.

Another object is to avoid injury to the table top or cover, particularly when the temperature within the housing is increased for the purpose of cooking.

These and other detail objects as will appear from the following description are attained by the structure shown in the accompanying drawings, in which.

Figure 1:
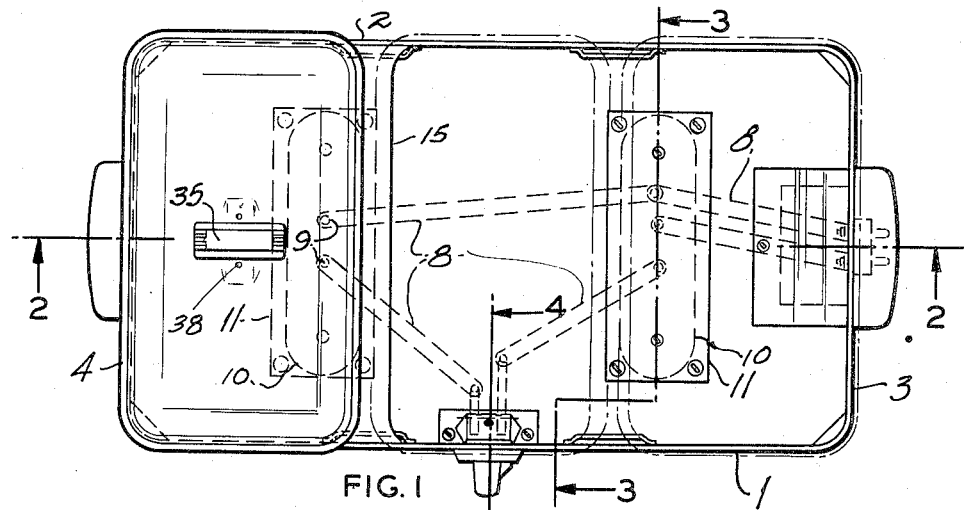
Figure 1 is a top view of a housing arranged to mount three container units, one of which is shown in the housing.
Figure 2:
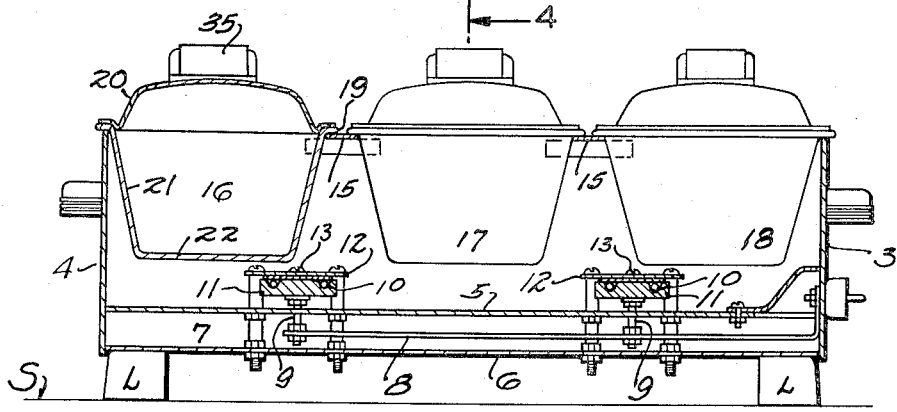
Figure 2 is a longitudinal vertical section taken on the line 2—2 of Figure 1, but showing two additional containers.

The housing includes an upright front wall 1, a rear wall 2, end walls 3 and 4, and includes vertically spaced inner and outer bottom walls 5 and 6 extending substantially the full distance between the upright walls. Legs L, preferably of non-metallic material, space the lower wall above a supporting surface S on which the device is placed. The space between walls 5 and 6 forms a chamber 7 for the electric circuit bus bars 8, which lead to terminal posts 9 depending from resistance heater elements 10, substantially embedded in porcelains 11, which are suspended from baffle plates 12 by bolts 13. The baffle plates are mounted on studs 14 which also serve to support inner wall 5 and hold it spaced from lower wall 6.

In the arrangement shown, there are two heaters 10, 11, each spaced about one-fourth the length of the housing from an adjacent end wall and about one-half the length of the housing from the other heater.

The upper portions of the front and rear walls 1, 2 are connected by and carry cross bars 15 spaced approximately one-third the length of the housing from each end thereof and approximately one-third the length of the housing from each other.

Three dish-like containers 16, 17, 18, preferably of high temperature resistance glass, are mounted in the housing, preferably by the overlapping of ledges 19, projecting from their upper edges, over the adjacent edges of the housing side and end walls and over bars 15. Each container is provided with a detachable cover 20 resting upon the upper faces of ledges 19.

The side and end walls 21 of each food container converge downwardly and merge with the container bottom wall 22 which is spaced a substantial distance above the level of baffle plates 12.

With the heaters and containers positioned relative to each other and to the walls of the housing and to the heaters as illustrated in the drawings, each container is subjected to heat radiating directly from the heaters, to heat reflected from portions of the housing walls, and to the heat of convection currents of air passing over the heaters and along the walls of the containers.

Obviously each of the two end containers 16, 18, extending in part immediately over the adjacent heater, receives more heat radiated directly from that heater than does the middle container 17, which does not immediately overlie either heater, and each end container receives all of the heat reflected from the adjacent housing end wall. The middle container receives some radiant heat from both heaters and some reflected heat from the bottom, front, and rear walls of the housing, but not so much reflected heat as does each of the end containers, because it is shielded from the housing end walls by the two end containers. Convection currents circulate around both side and end walls and beneath the bottom wall of each container.

A thermostat control is mounted in an opening in the housing front wall 1 and comprises an escutcheon plate 25 with clips 26 at its sides and ends for attaching it to housing wall 1. A sheet 27 of spring material has legs 28 yieldingly holding the sheet spaced as shown from the escutcheon plate and from housing front wall 1.

Figure 4:
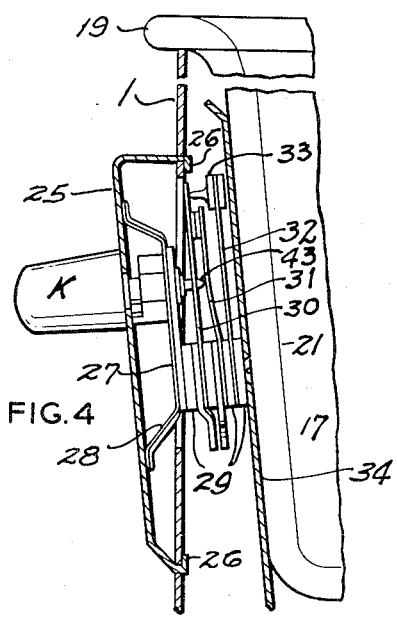
Figure 4 is a detail transverse section taken on the line 4—4 of Figure 1 and drawn to a larger scale than Figures 1, 2, and 3.

Sheet 27 mounts insulator washers 29 and switch blades 30 and 31 and a bi-metal thermostat strip 32, constructed to deflect its upper end, when heated to a predetermined temperature, to the left from the position shown in Figure 4, so that the button 33 at the upper end of the thermostat will move switch blade 30 away from blade 32 which is held against such movement by a button 43 on a shaft which mounts a control knob K projecting from plate 25. Button 43 passes freely through an opening in blade 30 and engages blade 31. Movement of knob K in a clockwise direction retracts button 43, permitting the relatively strong switch blade 31 to move, with switch blade 30, to the left. Movement of knob K in an anti-clockwise direction advances button 43 until the relatively weak spring blade 30 engages thermostat button 33. Further movement of the knob will separate the switch contact points and open the circuit for the heaters.

A heat conducting plate 34 is carried on inner washer 29 and is disposed to contact the adjacent end wall 21 of the middle container. The heat transmitted by the container to plate 34 affects thermostat 32 to actuate the circuit switch and the temperature of plate 34 controls the switch rather than the temperature of baffle plates 12 or the temperatures of the convection currents of air in the casing. Hence, the heaters remain on or off according to the temperature of the contents of container 17. Because of the relation between the heaters and the housing walls, the contents of all the containers will be substantially equal.

Figure 3:
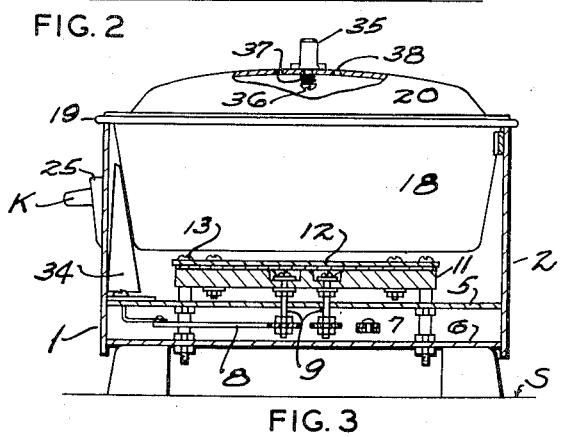
Figure 3 is a transverse vertical section taken on the line 3—3 of Figure 1, but showing the middle container in the housing.

Each cover 20 has an elongated handle 35 rotatably mounted upon the cover by a screw 36 and a compression spring 37 and may be rotated from the full line position shown in Figure 1 to the broken line position to expose steam outlets 38 in the cover. See Figure 3.

The structure may be placed upon a table which may be protected from scorching or similar heat injury by the space between it and between wall 6. The food in containers 16, 17, and 18 may be cooked or heated as desired by substantially uniform temperatures due to the spacing of the heaters relative to the containers and due to the contours of the containers relative to the walls of the housing. After cooking, the temperature of the contents of the containers may be held to less heat by adjustment of the thermostatically controlled switch for as long a period as may be desired. Serving plates may be filled direct from the containers while mounted in the housing or the containers may be lifted from the housing and passed around the table and other containers placed in the housing for cooking or for merely maintaining them palatably hot.

The details of construction may be varied substantially without departing from the spirit of the invention and the exclusive use of those modifications coming within the scope of the claims is contemplated.

What is claimed is:

1. In a food heater of the class described, a housing having side and end walls and a bottom wall, electric resistance heater elements positioned above said bottom wall and spaced from each other and from the end walls, and removable dish-like food containers carried by said housing with the bottoms of the containers above the level of said heating elements, there being a container at each end of the housing, the bottom walls of said containers being directly over but spaced from the corresponding heaters, a third food container between said first-mentioned containers, the side walls of each container being spaced from the adjacent walls of the housing and from the adjacent containers and providing a substantially uninterrupted air space between the containers and the housing walls and the heaters whereby the containers may be heated by air currents and by radiation from the heaters and by reflection from the housing walls and substantially throughout their height, the upright walls of each container being inclined inwardly and downwardly from the top to the bottom of the container and away from the walls of the housing and from the walls of the adjacent container, and the upper edges of all of said walls being contiguous to prevent discharge of heated air from the assembly housing and containers.

2. In a food heater of the class described, a housing having side and end walls and a bottom wall, electric resistance heater elements positioned above said bottom wall and spaced from each other and from the end walls, and removable dish-like food containers carried by said housing with the bottoms of the containers above the level of said heating elements, there being a container at each end of the housing, the bottom walls of said containers being directly over but spaced from the corresponding heaters, a third food container between said first-mentioned containers, the side walls of each container being spaced from the adjacent walls of the housing and from the adjacent containers and providing a substantially uninterrupted air space between the containers and the housing walls and the heaters whereby the containers may be heated by air currents and by radiation from the heaters and by reflection from the housing walls and substantially throughout their height, the upright walls of the containers being inclined inwardly and downwardly from the top to bottom of the container and away from the walls of the housing and from the walls of the adjacent container to provide access for convection heating currents of air to the upright walls of the container, there being a thermostat spaced above the bottom wall of the housing with a heat conducting plate positioned in contact with one upright end wall of the middle container.

3. In a heater of the class described, an open top housing with side and end walls and a bottom wall, two cross bars extending between the tops of the side walls and spaced equally from the adjacent end walls and from each other, food containers with outturned rims supported on said cross bars and the upper edges of said side and end walls, said containers having their bottoms spaced above said housing bottom wall, narrow and relatively long heating elements extending horizontally above said bottom wall beneath a portion of the bottom wall of one end container and beneath the space between the said container and the middle container, and similarly long and narrow baffle plates overlying said heaters and each directing convection currents of air in substantially equal proportions towards the end of the housing and towards the middle of the housing.

4. In a food heater of the class described, a housing having side and end walls and a bottom wall, elongated relatively narrow resistance heaters positioned above said bottom wall and elongated transversely of the housing side walls, the longitudinal axis of each heater being spaced from a housing end wall approximately one-fourth the length of the housing and said heater axes being spaced from each other approximately one-half the length of the housing, two removable dish-like food containers mounted in said housing near the ends thereof with their bottoms in part directly over and spaced above said heaters, a third dish-like food container intermediate the two first-mentioned containers with its bottom spaced longitudinally of the housing from both of the heaters, there being a substantially continuous air circulating space around said heaters and containers throughout the length and width of the housing, each of the heaters including side walls converging downwardly from the top of the container, the upper portions of the side of each container being flanged outwardly and substantially abutting the corresponding portions of the adjacent container, and the lower portions of said side walls being substantially spaced from the corresponding portions of the adjacent container to provide substantial areas for currents of heated air and for radiant heat moving from said heaters directly to the side walls of the containers.

References Cited in the file of this patent

UNITED STATES PATENTS

| 1,205,569 | Schwimmer | Nov. 21, 1916 |
| 1,814,754 | James | July 14, 1931 |
| 2,187,196 | Douglass | Jan. 16, 1940 |
| 2,251,582 | White | Aug. 5, 1941 |
| 2,259,519 | Ershler | Oct. 21, 1941 |
| 2,520,543 | Hawkins | Aug. 29, 1950 |